United States Patent
Miyata

(10) Patent No.: US 11,948,321 B2
(45) Date of Patent: Apr. 2, 2024

(54) THREE-DIMENSIONAL GEOMETRY MEASUREMENT APPARATUS AND THREE-DIMENSIONAL GEOMETRY MEASUREMENT METHOD

(71) Applicant: Mitutoyo Corporation, Kanagawa (JP)

(72) Inventor: Kaoru Miyata, Ibaraki (JP)

(73) Assignee: MITUTOYO CORPORATION, Kawasaki (JP)

(*) Notice: Subject to any disclaimer, the term of this patent is extended or adjusted under 35 U.S.C. 154(b) by 263 days.

(21) Appl. No.: 17/106,986

(22) Filed: Nov. 30, 2020

(65) Prior Publication Data

US 2021/0174531 A1  Jun. 10, 2021

(30) Foreign Application Priority Data

Dec. 9, 2019 (JP) ................................ 2019-222105
Nov. 11, 2020 (JP) ................................ 2020-187857

(51) Int. Cl.
*G06T 7/60* (2017.01)
*G01B 11/25* (2006.01)
*G06T 7/521* (2017.01)
*G06T 7/73* (2017.01)

(52) U.S. Cl.
CPC ............ *G06T 7/60* (2013.01); *G01B 11/2545* (2013.01); *G06T 7/521* (2017.01); *G06T 7/74* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 2020/0175284 A1* | 6/2020 | Viswanathan | G06T 7/73 |
| 2020/0334840 A1* | 10/2020 | Wang | G06T 7/521 |
| 2021/0319573 A1* | 10/2021 | Zhang | G06T 11/003 |

FOREIGN PATENT DOCUMENTS

JP   2019-516983   6/2019

* cited by examiner

*Primary Examiner* — Xiaolan Xu
(74) *Attorney, Agent, or Firm* — Rankin, Hill & Clark LLP

(57) ABSTRACT

A three-dimensional geometry measurement apparatus including: a preliminary measurement part that creates a plurality of pieces of preliminary measurement data indicating three-dimensional coordinates of a reference point on a reference instrument; a reference data creation part that creates reference data; a calculation part that calculates a correction value on the basis of the reference data and the preliminary measurement data which does not match the reference data; a target measuring part that creates target measurement data indicating results of measuring a measurement point of the object to be measured; a correction part that corrects the target measurement data in the measurement system corresponding to the preliminary measurement data that does not match the reference data, on the basis of the correction value; and a geometry identification part that identifies a geometry of the object to be measured using the corrected target measurement data.

9 Claims, 12 Drawing Sheets

→ x

THREE-DIMENSIONAL GEOMETRY MEASUREMENT APPARATUS AND THREE-DIMENSIONAL GEOMETRY MEASUREMENT METHOD

CROSS-REFERENCE TO RELATED APPLICATIONS

The present application claims priority to Japanese Patent Application number 2019-222105, filed on Dec. 9, 2019 and Japanese Patent Application number 2020-187857, filed on Nov. 11, 2020. The contents of these applications are incorporated herein by reference in their entirety.

BACKGROUND

The present disclosure relates to a three-dimensional geometry measurement apparatus and a three-dimensional geometry measurement method for measuring a three-dimensional geometry of an object to be measured.

A light-pattern projecting method uses the principle of triangulation and performs a three-dimensional (3D) geometry measurement by projecting a pattern of stripes from a projector onto an object to be measured, and then by capturing the pattern that changes along the geometry of the object to be measured with an optical device such as a camera. Japanese Unexamined Patent Application No. 2019-516983, describes capturing a pattern projected onto an object to be measured by using a plurality of optical devices in the light-pattern projecting method.

In the method described in Japanese Unexamined Patent Application No. 2019-516983, there was an issue that measurement results are different between the case where a geometry of the object to be measured is measured using one of the plurality of optical devices and the case where the geometry of the object to be measured is measured using the other optical device.

SUMMARY

This disclosure focuses on this point, and an object of the disclosure is to provide a three-dimensional (3D) geometry measurement apparatus and a 3D geometry measurement method, which are capable of preventing an occurrence of inconsistency in measurement results when a geometry of an object to be measured is measured using different optical devices.

A 3D geometry measurement apparatus of the first aspect for measuring a three-dimensional geometry of an object to be measured on the basis of a captured image obtained by capturing the object to be measured, the three-dimensional geometry measurement apparatus includes: a plurality of optical devices; a preliminary measurement part that creates a plurality of pieces of preliminary measurement data indicating three-dimensional coordinates of a reference point on a reference instrument by capturing the reference instrument in a plurality of measurement systems corresponding to combinations of different optical devices among the plurality of optical devices; a reference data creation part that creates reference data on the basis of one or more of the plurality of pieces of preliminary measurement data; a calculation part that calculates a correction value on the basis of the reference data and the preliminary measurement data which does not match the reference data among the plurality of pieces of preliminary measurement data; a target measuring part that creates a plurality of pieces of target measurement data indicating results of measuring a measurement point of the object to be measured with the plurality of measurement systems; a correction part that corrects the target measurement data in the measurement system corresponding to the preliminary measurement data that does not match the reference data on the basis of the correction value; and a geometry identification part that identifies a geometry of the object to be measured using the corrected target measurement data corrected with the correction part.

A three-dimensional geometry measurement method of the second aspect of the embodiment for measuring a three-dimensional geometry of an object to be measured on the basis of a captured image obtained by capturing an object to be measured, the three-dimensional geometry measurement method includes the steps of: creating a plurality of pieces of preliminary measurement data indicating three-dimensional coordinates of a reference point on a reference instrument by capturing the reference instrument with a plurality of measurement systems corresponding to combinations of different optical devices among a plurality of optical devices; creating reference data on the basis of one or more of the plurality of pieces of preliminary measurement data; calculating a correction value on the basis of the reference data and the preliminary measurement data which does not match the reference data among the plurality of pieces of preliminary measurement data; creating a plurality of pieces of target measurement data indicating results of measuring a measurement point of the object to be measured with the plurality of measurement systems; correcting the target measurement data in the measurement system corresponding to the preliminary measurement data that does not match the reference data on the basis of the correction value; and identifying a geometry of the object to be measured using the corrected target measurement data.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of a Three-Dimensional (3D) Geometry Measurement Apparatus 100]

Figure 1A:
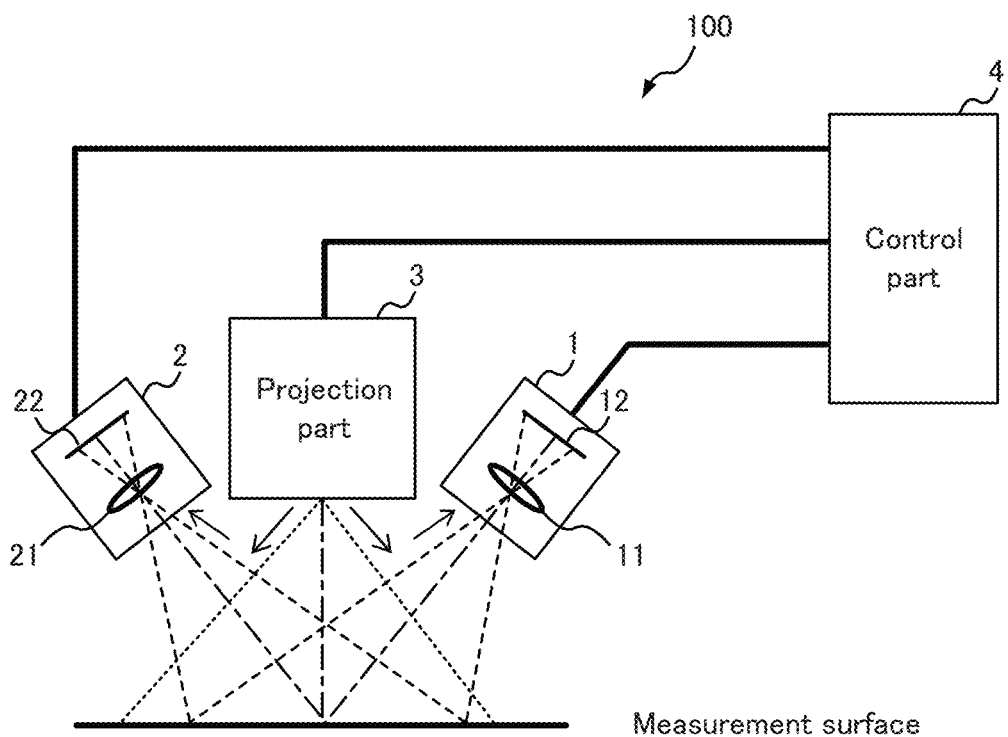
FIGS. 1A and 1B illustrate an outline of a 3D geometry measurement apparatus according to the embodiment.
Figure 1B:
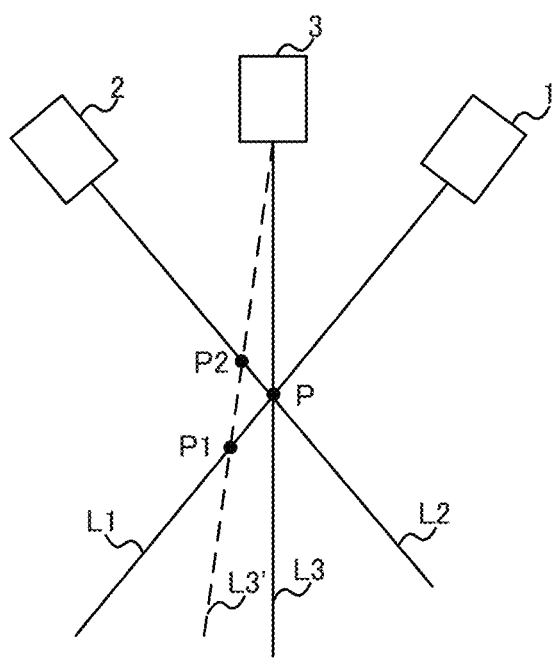

FIGS. 1A and 1B illustrate an outline of a 3D geometry measurement apparatus 100 according to the embodiment. FIG. 1A shows the configuration of the 3D geometry measurement apparatus 100. The 3D geometry measurement apparatus 100 includes, as optical devices, a first capturing part 1, a second capturing part 2, and a projection part 3. The 3D geometry measurement apparatus 100 includes a control part 4 that controls various operations of the optical devices.

The projection part 3 is a projection apparatus having a light source such as a light emitting diode, a laser, or the like. The projection part 3 projects a projection image, including patterns for identifying projection coordinates, onto a measurement surface of the object to be measured. The projection coordinates indicate positions of projection pixels composing a projection image which the projection part 3 projects. The projection coordinates may be a one-dimensional coordinate indicating either a vertical or horizontal position of the projection image, or two-dimensional coordinates indicating both the vertical and horizontal positions of the projection image. The patterns are, for example, stripe patterns. The number of projection parts 3 is not limited to one, and the 3D geometry measurement apparatus 100 may include any number of projection parts.

The first capturing part 1 includes a lens 11 and an imaging element 12. The first capturing part 1 generates a first captured image by capturing the projection image projected on the object to be measured in response to the projection part 3 projecting the projection image onto the object to be measured. The first capturing part 1 is placed in such a manner that the optical axis of the first capturing part 1 forms a predetermined angle with the optical axis of the projection part 3.

The second capturing part 2 has a lens 21 and an imaging element 22. The second capturing part 2 generates a second captured image by capturing the projection image projected on the object to be measured in response to the projection part 3 projecting the projection image onto the object to be measured. The second capturing part 2 is placed in such a manner that the optical axis of the second capturing part 2 forms a predetermined angle with the optical axis of projection part 3. The optical axis of the second capturing part 2 may be in the same plane as the optical axis of the first capturing part 1 and the optical axis of the projection part 3, but is not limited to this. The control part 4 is implemented by a computer, for example. The control part 4 measures a 3D geometry of the object to be measured on the basis of a plurality of captured images generated by the first capturing part 1 and the second capturing part 2. Further, the number of capturing parts is not limited to two, and the 3D geometry measurement apparatus 100 may be provided with any number of capturing parts.

FIG. 1B illustrates an error in a geometry measurement of the object to be measured by a plurality of measurement systems of the 3D geometry measurement apparatus 100. The 3D geometry measurement apparatus 100 measures the 3D geometry using the plurality of measurement systems (a first measurement system and a second measurement system) corresponding to combinations of different optical devices.

The 3D geometry measurement apparatus 100 measures 3D coordinates of a measurement point P by using the projection part 3 and the first capturing part 1 when the first measurement system is used. As shown in FIG. 1B, the 3D geometry measurement apparatus 100 identifies, among the projection pixels included in the projection image which the projection part 3 projects, which projection pixel of light irradiates the measurement point P. In the example shown in FIG. 1B, the measurement point P exists on a light path L3 through which light of the identified projection pixel passes.

The 3D geometry measurement apparatus 100 identifies which first captured pixel, included in the first captured image captured by the first capturing part 1 in the measurement of the 3D coordinates of the measurement point P, the measurement point P is reflected in. The first captured pixel is the smallest unit included in the first captured image. In the example shown in FIG. 1B, the measurement point P exists on a light path L1 corresponding to the identified first captured pixel. The 3D geometry measurement apparatus 100 measures, using triangulation, the 3D coordinates of the measurement point P by obtaining a position of an intersection point of the light path L3 and the light path L1.

On the other hand, the 3D geometry measurement apparatus 100 measures the 3D coordinates of the measurement point P by using the projection part 3 and the second capturing part 2 when the second measurement system is used. The 3D geometry measurement apparatus 100 identifies which second captured pixel, included in the second captured image captured by the second capturing part 2 in the measurement of the 3D coordinates of the measurement point P, the measurement point P is reflected in. The second captured pixel is the smallest unit included in the second captured image. In the example shown in FIG. 1B, the measurement point P exists on a light path L2 corresponding to the identified second captured pixel. As described above, since the measurement point P exists on the light path L3, the 3D geometry measurement apparatus 100 measures the 3D coordinates of the measurement point P by obtaining a position of an intersection point of the light path L2 and the light path L3.

When there is no error in the first measurement system and the second measurement system, since both (i) an intersection point between the light path L1 and the light path L2 and (ii) the intersection point between the light path L1 and the light path L3 approximately coincide with the measurement point P, as shown in FIG. 1B, measurement results of the 3D coordinates will not change regardless of which measurement system the measurement point P is measured with. Therefore, the 3D geometry measurement apparatus 100 can improve measurement accuracy by using, for example, a mean value of the measurement results of a plurality of measurement systems.

However, when there is an error, due to distortion or the like of a lens (not shown), in a light path through which light of the projection pixel of the projection part 3 passes, the 3D geometry measurement apparatus 100 identifies that the measurement point P exists on a light path L3', indicated by the broken line in FIG. 1B. That is, the 3D geometry measurement apparatus 100 erroneously measures 3D coordinates of the intersection point P1 of the light path L1 and the light path L3' as the 3D coordinates of the measurement point P when the measurement point P is measured by the first measurement system that includes the projection part 3 and the first capturing part 1.

Further, the 3D geometry measurement apparatus 100 would result in measuring 3D coordinates of the intersection point P2 of the light path L2 and the light path L3' as the 3D coordinates of the measurement point P when the measurement point P is measured by the second measurement system that includes the projection part 3 and the second capturing part 2. When a difference between the measurement point P1 and the measurement point P2 is large, an error in the measurement result of the 3D geometry measurement apparatus 100 becomes large.

The 3D geometry measurement apparatus 100 corrects the errors of the respective measurement systems in order to prevent such a reduction of measurement accuracy of the 3D coordinates. More specifically, the 3D geometry measurement apparatus 100 creates reference data indicating the standards for measurement data in the plurality of the measurement systems by measuring a predetermined reference instrument in advance.

Using this reference data, the 3D geometry measurement apparatus 100 calculates a correction value for correcting the measurement data of each of the plurality of the measurement systems, and corrects the measurement data in the measurement system corresponding to the correction value by using the calculated correction values. In this manner, the 3D geometry measurement apparatus 100 improves the measurement accuracy of the 3D coordinates of the measurement point P, and prevents measurement results from becoming different for different measurement systems.

[Configuration of the 3D Geometry Measurement Apparatus]

Figure 2:
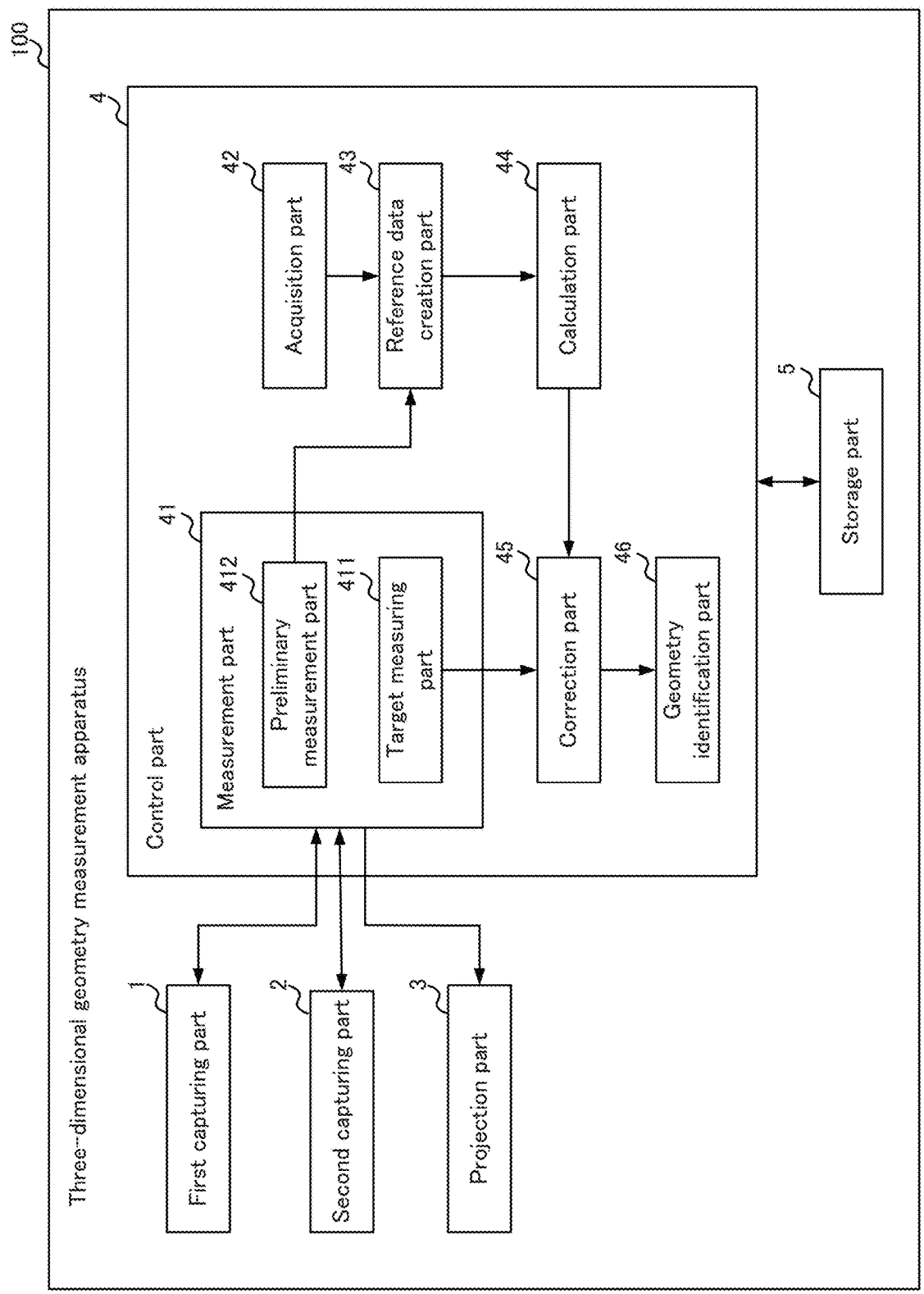
FIG. 2 shows a configuration of the 3D geometry measurement apparatus.

FIG. 2 shows an internal configuration of the 3D geometry measurement apparatus 100. The 3D geometry measurement apparatus 100 includes a storage part 5 in addition to the first capturing part 1, the second capturing part 2, the projection part 3, and the control part 4 shown in FIG. 1.

The storage part 5 includes a storage medium including a read only memory (ROM), a random access memory (RAM), a hard disk, and the like. The storage part 5 stores programs to be executed by the control part 4. The control part 4 is, for example, a central processing unit (CPU). By executing the programs stored in the storage part 5, the control part 4 functions as a measurement part 41, an acquisition part 42, a reference data creation part 43, a calculation part 44, a correction part 45, and a geometry identification part 46.

The measurement part 41 projects a projection image including a predetermined light pattern onto the object to be measured or the like with the projection part 3. The measurement part 41 generates captured images that are captured by the first capturing part 1 and the second capturing part 2 by capturing the projection image projected on the object to be measured or the like. The measurement part 41 generates a captured image by capturing a predetermined reference instrument. The measurement part 41 includes a target measuring part 411 and a preliminary measurement part 412.

The target measuring part 411 creates a plurality of pieces of target measurement data indicating measurement results by measuring a measurement point of the object to be measured with a plurality of measurement systems. The plurality of measurement systems are, for example, the following first measurement system to fourth measurement system.

The first measurement system: The first capturing part 1 and the projection part 3

The second measurement system: the second capturing part 2 and the projection part 3

The third measurement system: the first capturing part 1, the second capturing part 2, and the projection part 3

The fourth measurement system: the first capturing part 1 and the second capturing part 2

[Measurement by the First Measurement System]

With the first measurement system, the target measuring part 411 measures a measurement point of an object to be measured by combining one capturing part and one projection part. The target measuring part 411 projects a projection image including a predetermined light pattern onto the object to be measured by the projection part 3. FIGS. 3A to 3F respectively show examples of types of projection images including binary stripe patterns which the target measuring part 411 projects. The black regions in FIGS. 3A to 3F represent no-projection regions where the projection part 3 does not project light, and the white regions represent light-projection regions where the projection part 3 projects light.

Figure 3A:
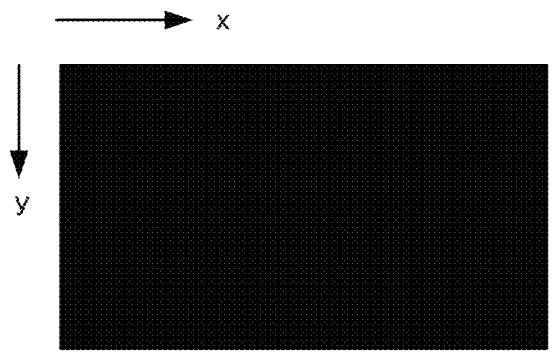
FIGS. 3A to 3F respectively show examples of types of projection images including binary stripe patterns projected onto an object to be measured.
Figure 3B:
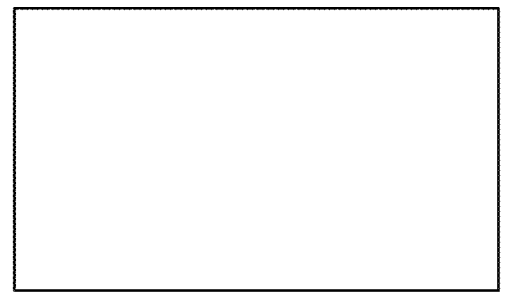
Figure 3C:
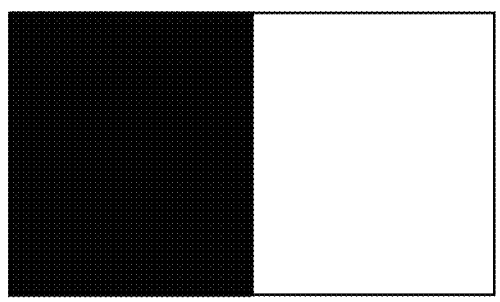
Figure 3D:
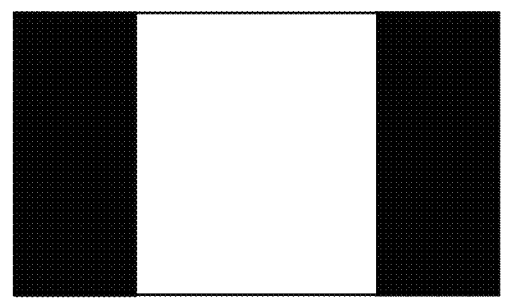
Figure 3E:
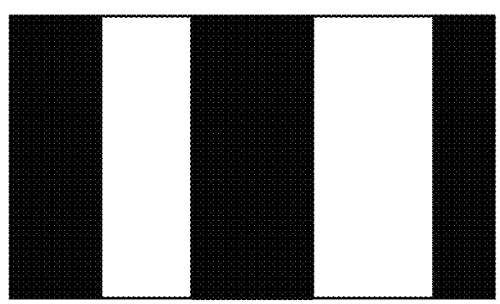
Figure 3F:
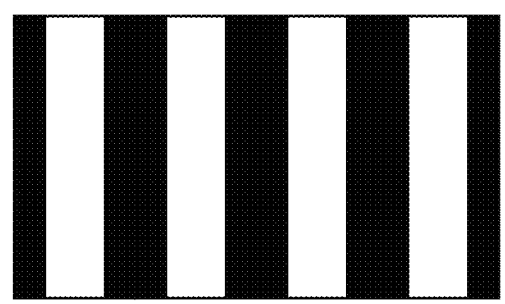

FIG. 3A shows a standard pattern by which light is not projected onto any part of the object to be measured (i.e., an all-black pattern). FIG. 3B shows a standard pattern by which light is projected onto the entire object to be measured (i.e., an all-white pattern). FIGS. 3C to 3F show binary stripe patterns, which are composed of light-projection regions and no-projection regions and in which the stripes that have a different width for each projection image are arranged in the same direction.

Figure 4:
FIG. 4 shows examples of Gray codes corresponding to the binary stripe patterns shown in FIGS. 3C to 3F.
Figure 5A:
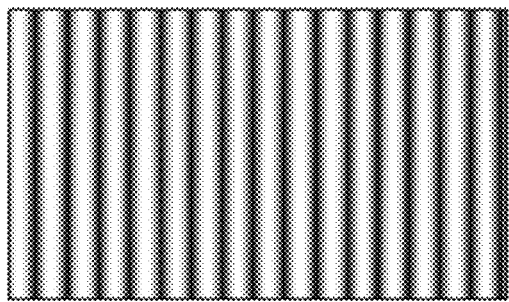
FIGS. 5A to 5D respectively show examples of gradation stripe patterns having sinusoidal luminance distributions.
Figure 5B:
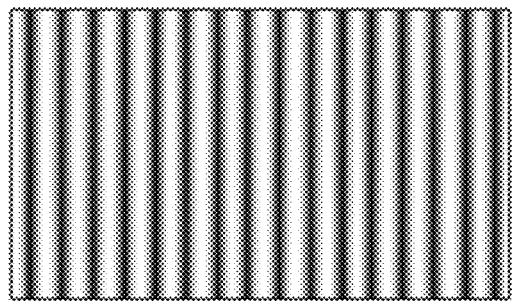
Figure 5C:
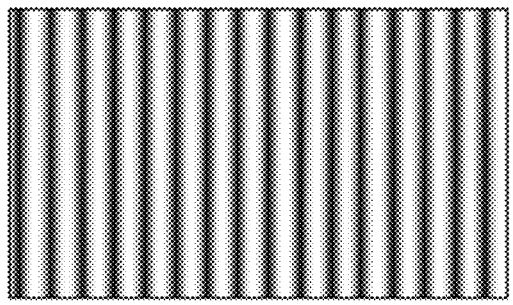
Figure 5D:
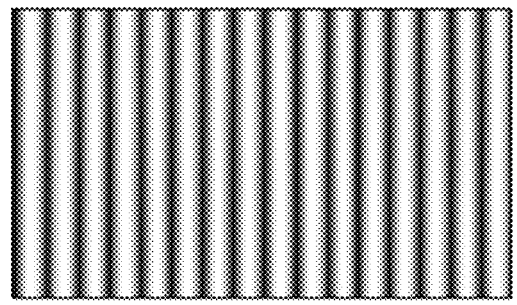

The stripe patterns shown in FIGS. 3C to 3F correspond to Gray codes and are used for identifying projection coordinates indicating positions of projection pixels of the projection image corresponding to first captured pixels in the captured image. FIG. 4 shows examples of Gray codes corresponding to the binary stripe patterns shown in FIGS. 3C to 3F. By associating 0s in the Gray codes with the no-projection regions and 1s with the light-projection regions, the binary stripe patterns shown in FIGS. 3C to 3F are generated.

Each position in the x-direction in FIGS. 3A to 3F and FIG. 4 is represented by a code value, which is the combination of the numbers 0 or 1 at the respective positions in the Gray codes. Position 0 in FIG. 4 corresponds to the code value of "0000," Position 1 corresponds to the code value of "0001," and Position 15 corresponds to the code value of "1000."

The target measuring part 411 projects projection images including gradation stripe patterns having sinusoidal luminance distributions onto the object to be measured. FIGS. 5A to 5D respectively show examples of gradation stripe patterns having sinusoidal luminance distributions. While the binary stripe patterns shown in FIGS. 3C to 3F are binary images composed of the black regions and the white regions, in the gradation stripe patterns shown in FIGS. 5A to 5D, shading changes in a sinusoidal manner from the white region to the black region along the width direction of the stripes. Intervals between the stripes in the gradation stripe patterns of FIGS. 5A to 5D are constant, and the spatial frequency of the stripes in the gradation stripe patterns is, for example, four times the spatial frequency of the binary stripe patterns of FIG. 3F.

The gradation stripe patterns of FIGS. 5A to 5D are different from each other in the point that the phases of the sine waves indicating the luminance distribution differ by 90 degrees from each other, and their luminance distributions are otherwise the same. The target measuring part 411 projects a total of ten pieces of the projection images: two standard patterns shown in FIGS. 3A and 3B, four binary stripe patterns shown in FIGS. 3C to 3F, and four gradation stripe patterns shown in FIGS. 5A to 5D. The gradation stripe patterns shown in FIGS. 5A to 5D, together with the stripe patterns shown in FIGS. 3A to 3F, are used for identifying the projection coordinates.

The target measuring part 411 generates, with the first measurement system, a first captured image, in which the projection image projected onto the object to be measured is captured by the first capturing part 1. The target measuring part 411 identifies projection coordinates corresponding to the first captured pixel of the first captured image on the basis of the patterns included in the first captured image. For example, the target measuring part 411 analyzes a change in shading in the patterns included in the first captured image, thereby identifying the projection coordinates indicating a position of the projection pixel corresponding to the first captured pixel included in the first captured image.

The target measuring part 411 calculates, for each pixel, an average of a luminance value when the all-black pattern shown in FIG. 3A is projected and a luminance value when the all-white pattern shown in FIG. 3B is projected, as a median. Similarly, regarding the first captured images captured while the binary stripe patterns of FIGS. 3C to 3F are projected onto the object to be measured, the target measuring part 411 identifies the code values of the respective first captured pixels by comparing luminance values of the respective first captured pixels in four first captured images with corresponding median values. By identifying the code values, the target measuring part 411 can identify which binary stripe is reflected at each pixel position of the first captured pixel within the binary stripes projected toward different positions. The target measuring part 411 identifies the position, from Position 1 to Position 15 shown in FIG. 4, at which each first captured pixel included in the first captured image is included.

Further, the target measuring part 411 identifies a phase of a sine wave corresponding to the first captured pixel in the first captured image when the gradation stripe patterns having sinusoidal luminance distributions are projected onto the object to be measured, and identifies projection coordinates on the basis of the identified phase. Because the gradation stripe patterns of the projection image have periodicity, a plurality of projection pixels in the projection image have the same projection coordinates. Hereinafter, the projection coordinates with periodicity in the projection image are also referred to as relative projection coordinates. Furthermore, the projection coordinates uniquely determined in the projection image are also referred to as absolute projection coordinates.

Figure 6:
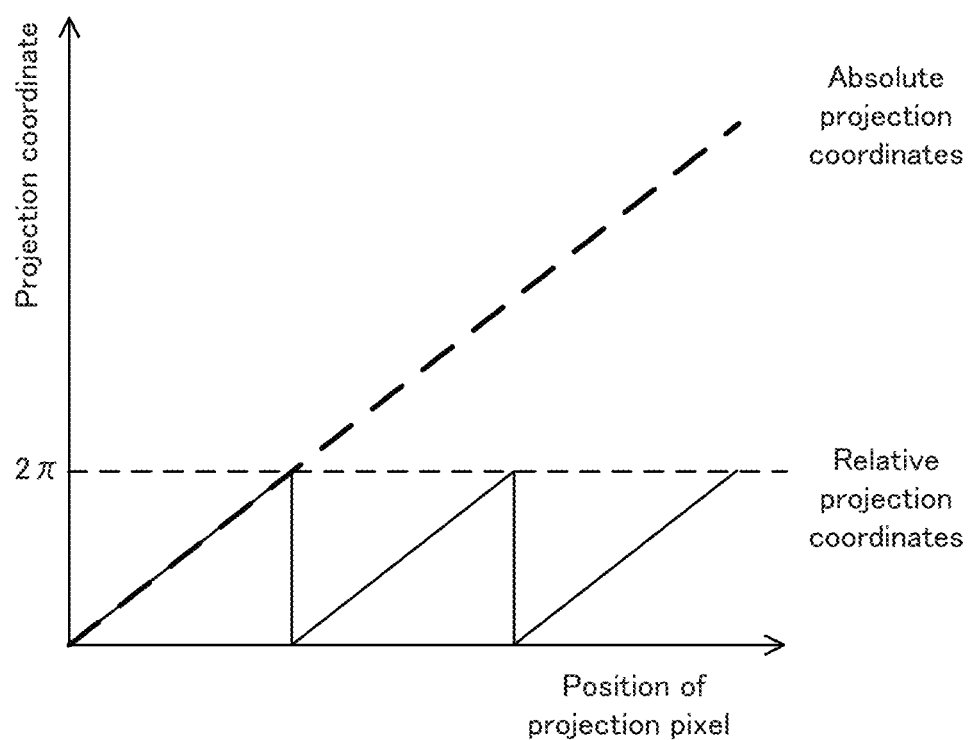
FIG. 6 shows a relationship between absolute projection coordinates and relative projection coordinates.

FIG. 6 shows a relationship between the absolute projection coordinates and the relative projection coordinates. The vertical axis of FIG. 6 indicates the projection coordinate. The horizontal axis of FIG. 6 indicates the positions of the projection pixels in the width direction of the stripes included in the projection image. The width direction is a direction orthogonal to a direction in which the stripes extend. As the solid line in FIG. 6 shows, the relative projection coordinates have periodicity. The relative projection coordinates show the same value for each cycle of a repetition of the gradation stripe patterns having sinusoidal luminance distributions. On the other hand, as a diagonally extending broken line in FIG. 6 shows, the absolute projection coordinates are uniquely determined in the projection image.

The target measuring part 411 identifies the relative projection coordinates corresponding to the first captured pixel by analyzing the shade of the gradation stripe patterns. The target measuring part 411 identifies, on the basis of Gray codes indicated by the binary stripe patterns, which position from Position 0 to Position 15 the first captured pixel corresponds to. The target measuring part 411 identifies the absolute projection coordinates corresponding to the first captured pixel on the basis of a relative position indicated by the relative projection coordinates in the position identified with Gray codes. The target measuring part 411 uses (i) two-dimensional coordinates of the first captured pixel and (ii) the identified one-dimensional absolute projection coordinate to identify 3D coordinates of the measurement point on the object to be measured corresponding to the first captured pixel by using the principle of triangulation.

The target measuring part 411 may project a plurality of projection images among which the directions of the stripes (i.e. directions in which the stripes extend) differ, and identify the projection coordinates corresponding to the first captured pixel for each of the projection images among which the directions of the stripes differ. The target measuring part 411 may project, onto the object to be measured, the plurality of projection images among which the directions of the stripes differ, and identify the projection coordinates corresponding to the first captured pixel for each of the projection images among which the directions of the stripes differ.

[Measurement by the Second Measurement System]

In the second measurement system, the target measuring part 411 measures 3D coordinates of a measurement point of an object to be measured by combining the second capturing part 2 and the projection part 3 in a similar manner as with the first measurement system.

[Measurement by the Third Measurement System]

In the third measurement system, the target measuring part 411 measures a measurement point of an object to be measured by combining the first capturing part 1, the second capturing part 2, and the projection part 3. The target measuring part 411 identifies the projection coordinates indicating the position of the projection pixel corresponding to the first captured pixel included in the first captured image in a similar manner as with the first measurement system. The target measuring part 411 identifies projection coordinates indicating a position of the projection pixel corresponding to the second captured pixel included in the second captured image.

Figure 7:
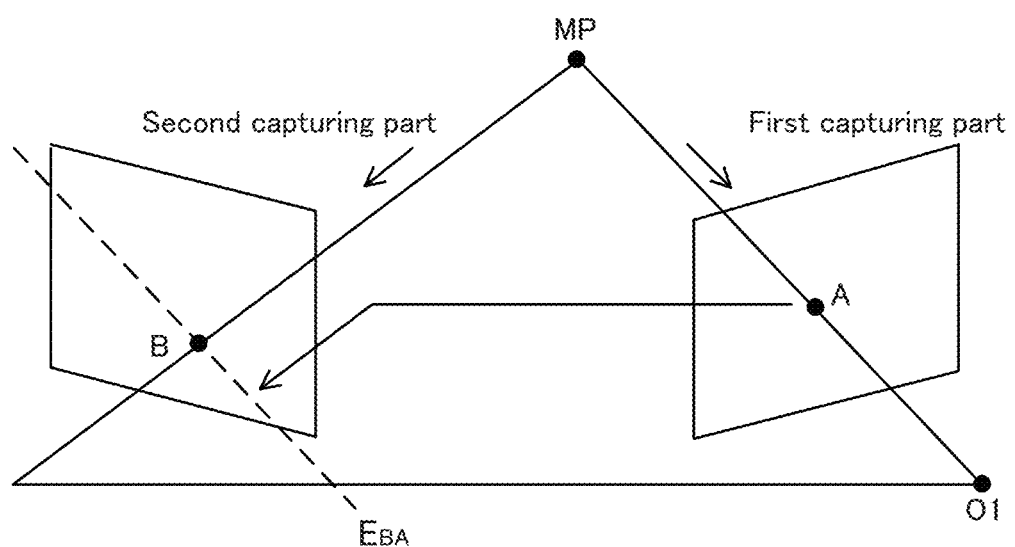
FIG. 7 shows an example of an epipolar line of a second captured image corresponding to a first captured pixel.

FIG. 7 shows an example of an epipolar line $E_{BA}$ of the second captured image corresponding to a first captured pixel A. Suppose that a focal point of the lens 11 of the first capturing part 1 is O1. A light path corresponding to the first captured pixel A is a straight line extending from the focal point O1 to a measurement point MP, and a straight line indicating this light path and projected on an image plane of the second capturing part 2 on the left side of FIG. 7 is the epipolar line $E_{BA}$. A second captured pixel B, which corresponds to the same measurement point MP as the first captured pixel A, in the image plane of the second capturing part 2 to the left of FIG. 7 is, due to the nature of geometrical restriction, at any position on the epipolar line $E_{BA}$. The target measuring part 411 reads arrangement information indicating an arrangement of the first capturing part 1 and the second capturing part 2 stored in advance in the storage part 5, and identifies the epipolar line $E_{BA}$ of the second captured image corresponding to the first captured pixel A on the basis of the read arrangement information. The arrangement information is information indicating, for example, focal length, position, and orientation.

As shown in FIG. 7, the target measuring part 411 selects the second captured pixel B corresponding to the same absolute projection coordinates as the first captured pixel A from among the second captured pixels located on the identified epipolar line $E_{BA}$. The target measuring part 411 measures 3D coordinates of a common measurement point MP corresponding to the first captured pixel A and the selected second captured pixel B by using the principle of triangulation in the first captured pixel A and the selected second captured pixel B.

[Measurement by the Fourth Measurement System]

In the fourth measurement system, the target measuring part 411 identifies correspondence between the first captured pixel of the first captured image and the second captured pixel of the second captured image. The target measuring part 411 measures 3D coordinates of a feature point such as texture, edge, or the like without projecting a projection image onto an object to be measured when the object to be measured has the feature point.

The target measuring part 411 identifies the first captured pixel corresponding to the feature point of the object to be measured. Further, the target measuring part 411 identifies the second captured pixel corresponding to the same feature point. The target measuring part 411 uses (i) the first captured pixel corresponding to the feature point and (ii) the second captured pixel corresponding to the same feature point to measure the 3D coordinates of this feature point by using the principle of triangulation.

[Stripe Patterns in Two Directions]

It should be noted that the target measuring part 411 is not limited to the example of creating the target measurement data using only the projection image including the stripe patterns extending in one direction. For example, the target measuring part 411 may create the target measurement data by projecting a projection image including stripe patterns extending in a horizontal direction in addition to a projection image including stripe patterns extending in a vertical direction onto the object to be measured. The target measuring part 411 identifies both vertical projection coordinate and horizontal projection coordinate corresponding to the captured pixel by projecting the projection image including the stripe patterns extending in the horizontal direction onto the object to be measured. In this case, the target measuring part 411 uniquely identifies the projection pixel corresponding to the captured pixel without using an epipolar line.

[Measurement of a Reference Instrument]

The preliminary measurement part 412 creates a plurality of pieces of preliminary measurement data indicating 3D coordinates of a reference point on a reference instrument by capturing a predetermined reference instrument in the plurality of measurement systems corresponding to the combinations of different optical devices among the plurality of optical devices. A plurality of reference points are arranged on the reference instrument. For example, the preliminary measurement part 412 measures the 3D coordinates of the reference point with each of the first measurement system to the fourth measurement system using the same method as with the target measuring part 411.

Figure 8A:
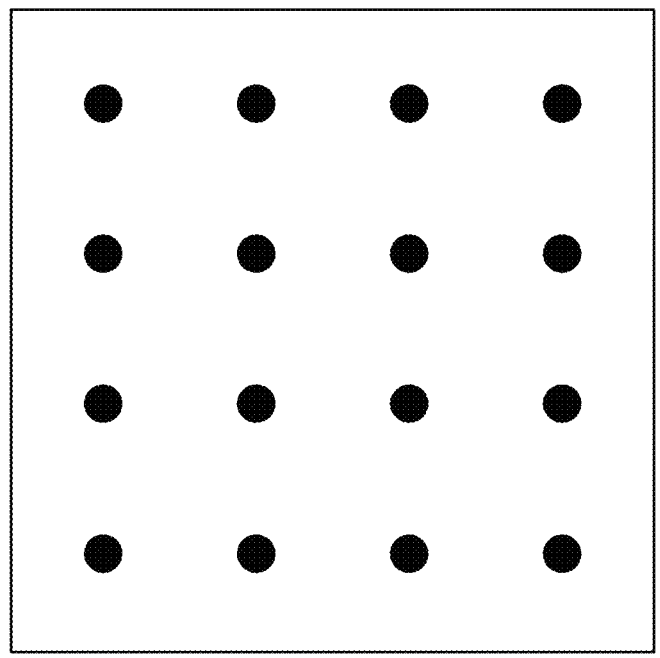
FIGS. 8A and 8B each show an example of a reference instrument.
Figure 8B:
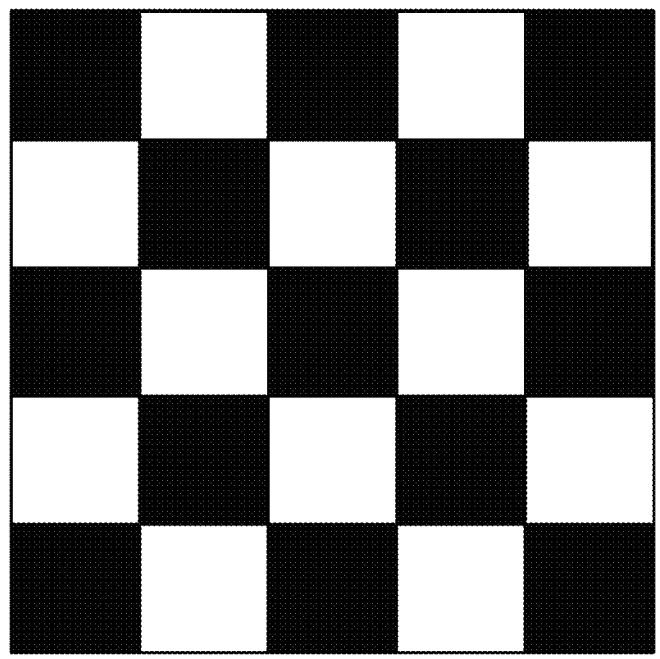

FIGS. 8A and 8B each show an example of the reference instrument. FIGS. 8A and 8B each show the reference instrument viewed from above. FIG. 8A shows a reference instrument in which a plurality of black circles are arranged in the longitudinal and lateral directions in an ordered state. FIG. 8B shows a checkered reference instrument. When the reference instrument shown in FIG. 8A is used, the preliminary measurement part 412 determines the center of the black circle as a reference point, and creates the preliminary measurement data indicating the 3D coordinates of this reference point. When the reference instrument shown in FIG. 8B is used, the preliminary measurement part 412 determines each vertex of the white squares and the black squares that compose the checkerboard pattern as a reference point, and creates the preliminary measurement data indicating the 3D coordinates of the determined reference point. The preliminary measurement data contains information indicating the 3D coordinates of a plurality of reference points on the reference instrument.

Figure 9:
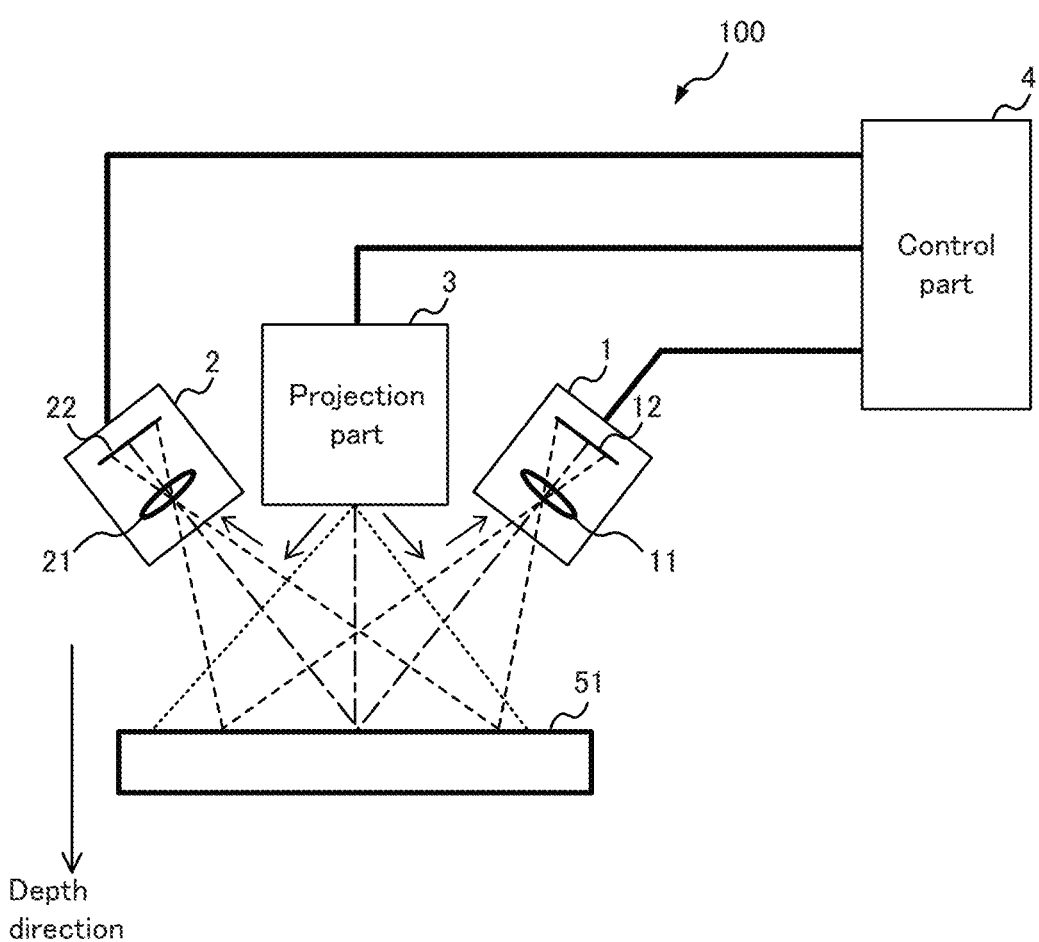
FIG. 9 shows how the reference instrument is measured.

FIG. 9 shows how a reference instrument 51 is measured. In an example of FIG. 9, the reference instrument 51 is a flat plate-shaped member, but is not limited to this, and any shape may be used as the reference instrument. The preliminary measurement part 412 captures the reference instrument 51 more than once. In the measurement, the reference instrument 51 is installed in order at a plurality of installation positions whose coordinates in a depth direction, shown by an arrow in FIG. 9, differ. The installation positions of the reference instrument 51 do not need to be precisely determined and may be schematic. Also, the 3D coordinates of the installation positions of the reference instrument 51 do not need to be measured in advance, and the reference instrument 51 may be installed at any installation position. Therefore, the measurement of the reference instrument 51 can be easily carried out at low cost in the 3D geometry measurement apparatus 100, since there is no need to prepare an instrument for positioning the reference instrument 51, another measuring instrument, or the like.

The preliminary measurement part 412 captures the reference instrument 51 in a state in which the reference instrument 51 is placed at the respective installation positions. The preliminary measurement part 412 creates preliminary measurement data indicating the 3D coordinates of the reference point of the reference instrument 51 at the plurality of installation positions on the basis of the captured images of the reference instrument 51 installed at the plurality of installation positions. Also, without being limited to the example in which the plurality of installation positions are set by moving the reference instrument 51 in parallel such that the coordinates in the depth direction differ from each other, the plurality of installation positions may be set by changing a posture of the reference instrument 51 such that the 3D coordinates differ from each other.

Also, the preliminary measurement part 412 is not limited to the example of measuring the 3D coordinates of the reference points arranged on the reference instrument 51 in advance. For example, the preliminary measurement part 412 may project a projection image including a mark for a particular position to be used as the reference point onto the reference instrument 51 with the projection part 3. The preliminary measurement part 412 may determine the position where the mark is projected as the reference point and measure the 3D coordinates of this reference point.

Also, the preliminary measurement part 412 may project a projection image including a pattern for identifying a reference point onto the reference instrument 51. The projection image including the pattern for identifying the reference point is, for example, a projection image including stripe patterns extending in one direction. The preliminary measurement part 412 may acquire the first captured image and the second captured image acquired by capturing the projection image projected onto the reference instrument 51. In this case, the preliminary measurement part 412 identifies the projection coordinates corresponding to the first captured pixel and the projection coordinates corresponding to the second captured pixel in a similar manner as with the target measuring part 411, and measures 3D coordinates of the particular position on the reference instrument 51 using the correspondence among the first captured pixel, the second captured pixel, and the projection image. The preliminary measurement part 412 may use this particular position as the reference point. In other words, the preliminary measurement part 412 may also project the stripe patterns onto the reference instrument 51 and use, as the reference point, a certain position commonly measured with the plurality of measurement systems.

Further, the preliminary measurement part 412 may project the projection coordinates corresponding to the first captured image and the projection coordinates corresponding to the second captured pixel by projecting the projection image including the stripe patterns extending in the vertical direction and the projection image including the stripe patterns extending in the horizontal direction onto the object to be measured. In this case, the preliminary measurement part 412 can obtain the correspondence between the first captured pixel and the second captured pixel by using the projection image including the stripe patterns extending in the vertical direction and the projection image including the stripe patterns extending in the horizontal direction, without using the epipolar line. Therefore, the preliminary measurement part 412 can reduce the risk of lowering measurement accuracy due to an error which may occur when identifying the epipolar line.

The acquisition part 42 acquires, from the storage part 5, relative position information indicating a positional relationship among the plurality of reference points included in the reference instrument 51. It is assumed that the positional relationship among the plurality of reference points is measured in advance with another measuring instrument. The positional relationship of the plurality of reference points is, for example, two-dimensional coordinates of a reference point other than the origin, when one of the reference points of the reference instrument 51 is assumed to be the origin.

[Creation of the Reference Data]

The reference data creation part 43 creates the reference data on the basis of one or more of a plurality of pieces of preliminary measurement data corresponding to the plurality of measurement systems. The reference data is data for matching each of the measurement data of the plurality of measurement systems with the measurement data of the other measurement systems.

For example, suppose that it is shown that a distance from projection part 3 to a position of a particular reference point is 199 millimeters in the first measurement system, a distance from the projection part 3 to the position of the same reference point is 201 millimeters in the second measurement system, and a distance from the projection part 3 to the position of the same reference point is 200 millimeters in the third measurement system. In this case, for example, the reference data creation part 43 matches the measurement data of each measurement system by determining 199 millimeters measured with the first measurement system as the reference data, performing a correction of subtracting 2 millimeters from the data measured with the second measurement system, and performing a correction of subtracting 1 millimeter from the data measured with the third measurement system. A method of correcting the distance has been described as an example, but in practice, it is desirable to correct the 3D coordinates.

The reference data creation part 43, for example, calculates a statistical quantity such as a mean value, a median value, or the like of the 3D coordinates of the same reference point included in the plurality of pieces of preliminary measurement data corresponding to different measurement systems. The reference data creation part 43 may create reference data in which the calculated statistical quantity is the 3D coordinates of the reference point. For example, the reference data creation part 43 calculates the mean value of the 3D coordinates of the same reference point measured with the first measurement system, the second measurement system, and the third measurement system. The reference data creation part 43 creates the reference data having the calculated mean value as the 3D coordinates of the reference point.

By referencing the relative position information which the acquisition part 42 acquired, the reference data creation part 43 may obtain an error between the positional relationship indicated by the relative position information and the positional relationship of the plurality of reference points indicated by the preliminary measurement data, and select any of the pieces of preliminary measurement data on the basis of the obtained error.

For example, when one of the reference points of the reference instrument 51 is the origin, the reference data creation part 43 obtains (i) the relative coordinates of the reference points other than the origin in the relative position information and (ii) the relative coordinates of the reference points other than the origin in the preliminary measurement data. The reference data creation part 43 obtains, for each reference point, an error between the relative coordinates of the reference points other than the origin in the relative position information and the corresponding reference points in the preliminary measurement data. The reference data creation part 43 obtains, for each measurement system, a statistical quantity of an error such as the sum of errors or a standard deviation at the plurality of reference points of the reference instrument 51, and selects the preliminary measurement data of the measurement system in which the statistical quantity such as the average of the obtained errors is the smallest among the plurality of measurement systems. Instead of the relative coordinates from the origin, a relative distance from the origin may be used.

In addition, when the plurality of reference points are arranged on a single plane in the reference instrument 51, the reference data creation part 43 identifies, using a least-squares method or the like, a virtual plane such that the sum of the distances from the virtual plane and the plurality of reference points on the reference instrument 51 indicated by the preliminary measurement data is the smallest. The reference data creation part 43 identifies such a plane for the plurality of pieces of preliminary measurement data corresponding to the different measurement systems. The reference data creation part 43 calculates, for each measurement system, the sum of the distances between (i) the identified plane and (ii) the plurality of reference points on the reference instrument 51 in the preliminary measurement data of the measurement system corresponding to the identified plane. The reference data creation part 43 may select the preliminary measurement data of the measurement system in which the calculated sum of the distances is the smallest.

With such configurations, the reference data creation part 43 can use the preliminary measurement data of the measurement system that most accurately reproduces the plane in which the plurality of reference points are arranged on the reference instrument 51. The reference data creation part 43 creates reference data on the basis of the selected preliminary measurement data. For example, the reference data creation part 43 uses the selected preliminary measurement data as reference data.

When a deviation between the plurality of pieces of preliminary measurement data corresponding to the plurality of measurement systems is equal to or greater than a predetermined value, the reference data creation part 43 does not need to create reference data and may display an error indicating that the deviation between the preliminary measurement data is large on a display part (not shown). In this manner, the reference data creation part 43 can prevent the reduction of measurement accuracy of the 3D geometry due to defects such as a deviation of an orientation of the optical device.

[Calculation of the Correction Value]

The calculation part 44 calculates the correction value on the basis of (i) the preliminary measurement data that does not match the reference data and (ii) the reference data created by the reference data creation part 43. The preliminary measurement data that does not match the reference data is, for example, preliminary measurement data measured by a measurement system, which is different from the measurement system corresponding to the reference data, when the reference data creation part 43 uses preliminary measurement data corresponding to a single measurement system as the reference data.

The calculation part 44 assumes that the reference data creation part 43 used the preliminary measurement data measured by the third measurement system as the reference data. The calculation part 44 identifies the 3D coordinates indicating a predetermined reference point in the first measurement system, which is different from the third measurement system, and identifies the 3D coordinates indicating the same reference point in the reference data. The calculation part 44 obtains a difference $\Delta C(x_{1,ij}, y_{1,ij}, z_{1,ij})$ between the two 3D coordinates using the following Equation 1.

$$\Delta C(x_{1,ij}, y_{1,ij}, z_{1,ij}) = [x_{1,ij}, y_{1,ij}, z_{1,ij}] - [x_{r,ij}, y_{r,ij}, z_{r,ij}] \quad \text{Equation 1}$$

In Equation 1, "1" in "$x_{1, i, j}$" is an index indicating the first measurement system, "i" is an index for identifying the reference point (i=1, 2, etc.), and "j" is an index for identifying the installation position of the reference instrument 51 (j=1, 2, etc.). $[x_{1,ij}, y_{1,ij}, z_{1,ij}]$ are the 3D coordinates indicated by the preliminary measurement data measured by the first measurement system. $[x_{r,ij}, y_{r,ij}, z_{r,ij}]$ are the 3D coordinates indicated by the reference data.

The calculation part 44 calculates a correction value for correcting the target measurement data measured by the first measurement system based on the obtained difference $\Delta C(x_{1,ij}, y_{1,ij}, z_{1,ij})$. As an example, the calculation part 44 uses the difference $\Delta C(x_{1,ij}, y_{1,ij}, z_{1,ij})$ as the correction value, but the correction value may be calculated using a known method on the basis of the difference $\Delta C(x_{1,ij}, y_{1,ij}, z_{1,ij})$.

When the reference data creation part 43 creates the reference data by averaging the 3D coordinates of the reference points indicated by the plurality of pieces of preliminary measurement data corresponding to the different measurement systems, or the like, the preliminary measurement data used for creating the reference data might not match the reference data. Therefore, the calculation part 44 may calculate the correction value on the basis of a difference between (i) the 3D coordinates of the reference point indicated by the preliminary measurement data used for creating the reference data and (ii) the 3D coordinates of the same reference point indicated by the reference data when creating the reference data by averaging the 3D coordinates of the reference points indicated by the plurality of pieces of preliminary measurement data, or the like.

The calculation part 44 calculates correction values corresponding to the reference points of the reference instrument 51 installed at the plurality of installation positions. For example, when the preliminary measurement part 412 creates three pieces of preliminary measurement data corresponding to three installation positions whose coordinates in the depth direction differ, the calculation part 44 creates a correction value corresponding to each of the three pieces of preliminary measurement data. The calculation part 44 associates (i) the index of the installation position of the reference instrument 51, (ii) the index for identifying the measurement system with which the measurement of the reference instrument 51 is performed, (iii) the index for identifying the reference point, and (iv) the correction values with each other, and stores them in the storage part 5.

Further, the calculation part 44 may identify a function for calculating a correction value corresponding to the 3D coordinates of the measurement point measured by the measurement system corresponding to the preliminary measurement data that does not match the reference data. For example, the calculation part 44 may identify a polynomial function for converting the target measurement data measured by the first measurement system into a correction value corresponding to the target measurement data using a known technique such as the least-squares method by referencing a relationship between the preliminary measurement data measured by the first measurement system and the corresponding correction value. In this case, the function is stored in the storage part 5 in advance as a part of programs or the like, and the calculation part 44 identifies a plurality of coefficients of the function stored in the storage part 5. The function for converting the target measurement data to the correction value $[\Delta c_{m,x}, \Delta c_{m,y}, \Delta c_{m,z}]$ can be expressed by the following Equation 2. In Equation 2, $(x_m, y_m, z_m)$ are the 3D coordinates of the measurement point. In the function of Equation 2, the correction value corresponding to each component of the 3D coordinates is calculated.

$$[\Delta c_{m,x}, \Delta c_{m,y}, \Delta c_{m,z}] = [f_x(x_m, y_m, z_m), f_y(x_m, y_m, z_m), f_z(x_m, y_m, z_m)] \quad \text{Equation 2}$$

More than one such function may be prepared by dividing it in a Z-direction (depth direction), for example. By doing this, the calculation part 44 can calculate the correction value using the functions with higher accuracy as individual polynomial functions, therefore correction results with higher accuracy are obtained.

The example in which the calculation part 44 creates the correction values corresponding to the reference points has been described. The calculation part 44 may calculate a correction value corresponding to a position other than the reference point at which the preliminary measurement data is acquired by interpolating on the basis of a plurality of correction values corresponding to the plurality of reference points. The calculation part 44 may divide a measurement space of each measurement system with cubic grids at equal intervals, calculate correction values corresponding to the individual grid points by interpolating on the basis of the plurality of correction values corresponding to the plurality of reference points, and store, in the storage part 5, a table in which the 3D coordinates of the grid points, the index for identifying the measurement system, and the calculated correction values are associated. By calculating the correction values for each of the grid points, the calculation part 44 can perform the correction using the correction value of the grid point closest to the measured coordinate value when correcting the measurement results of the 3D coordinates of the object to be measured.

[Correction of the Target Measurement Data]

The correction part 45 corrects the target measurement data of the measurement system corresponding to the preliminary measurement data that does not match the reference data, on the basis of the correction value. As an example, the correction part 45 corrects the target measurement data of the first measurement system, which is different from the third measurement system, when the reference data creation part 43 creates the reference data by selecting the preliminary measurement data measured by the third measurement system. The correction part 45 reads, from the storage part 5, a correction value associated with (i) the index of the installation position at which a difference between the coordinates in the depth direction indicated by the target measurement data and the coordinates in the depth direction of the reference point is minimal, (ii) the index indicating that it is the first measurement system, and (iii) the index indicating the reference point having the 3D coordinates closest to the 3D coordinates indicated by the target measurement data. The correction part 45 corrects, on the basis of the read correction value, the target measurement data measured by the first measurement system.

The correction part 45 may read, from the storage part 5, a correction value associated with the 3D coordinates of the grid point closest to the 3D coordinates indicated by the target measurement data and the index indicating the measurement system corresponding to the above grid point, and correct the target measurement data on the basis of the read correction value. The correction part 45 may read, from the storage part 5, correction values associated with the 3D coordinates of the plurality of grid points relatively close to the 3D coordinates indicated by the target measurement data, and obtain the correction values corresponding to the target measurement data by an interpolation process using the read plurality of correction values. Also, when obtaining the function for converting the target measurement data into the correction values, the correction part 45 may use this function to convert the target measurement data into the correction values and correct the target measurement data on the basis of the converted correction values.

The geometry identification part 46 uses the target measurement data corrected by the correction part 45 to identify a geometry of the object to be measured. The geometry identification part 46 identifies the 3D geometry of the object to be measured by connecting the 3D coordinates of the measurement points indicated by the plurality of pieces of corrected target measurement data. The geometry identification part 46 may identify the geometry of the object to be measured by connecting the 3D coordinates indicated by the plurality of pieces of the target measurement data corresponding to the different measurement systems.

There may be a case where the correction part 45 does not correct the target measurement data of the measurement system corresponding to the reference data. Therefore, when the target measurement data corresponding to the reference data is used, it is assumed that the geometry identification part 46 may identify the geometry of the object to be measured by using the target measurement data that has not been corrected by the correction part 45. The geometry identification part 46 may identify the geometry of the object to be measured by connecting (i) the 3D coordinates of the measurement point indicated by not corrected target measurement data corresponding to the reference data and (ii) the 3D coordinates of the measurement point indicated by the corrected target measurement data.

[Processing Procedure of Calculating the Correction Value]

Figure 10:
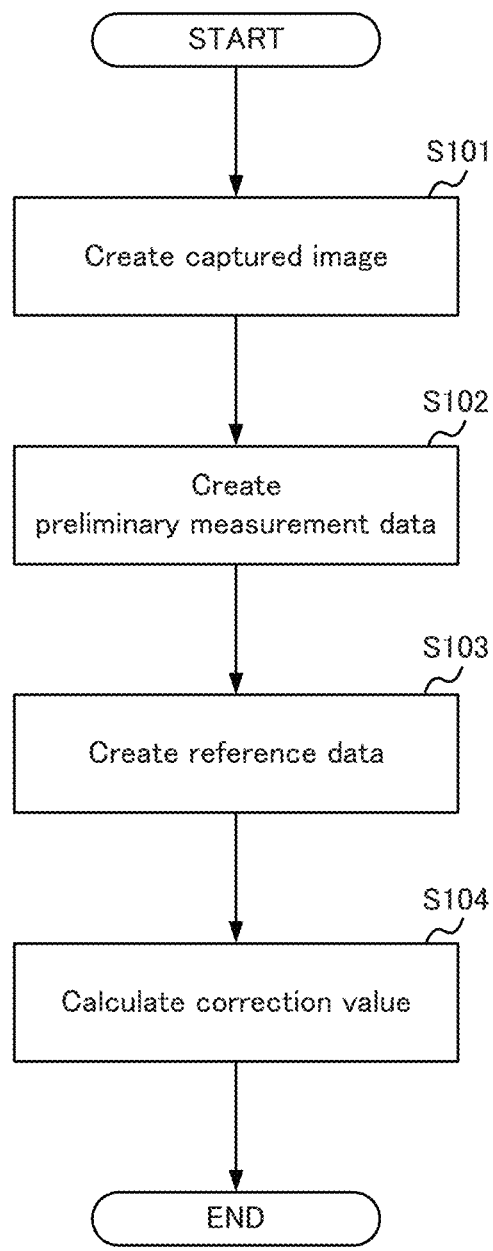
FIG. 10 is a flowchart showing a processing procedure of calculating a correction value by the 3D geometry measurement apparatus.

FIG. 10 is a flowchart showing a processing procedure of calculating the correction value by the 3D geometry measurement apparatus 100. This processing procedure starts when an operation reception part (not shown) of the 3D geometry measurement apparatus 100 receives a user's operation of instructing a calibration of each measurement system.

First, the preliminary measurement part 412 generates captured images in which a predetermined reference instrument 51 is captured with a plurality of measurement systems (S101). The preliminary measurement part 412 measures 3D coordinates of a reference point and creates preliminary measurement data indicating the measured 3D coordinates (S102). It is assumed that the preliminary measurement part 412 creates a plurality of pieces of preliminary measurement data corresponding to the plurality of measurement systems in S102. The reference data creation part 43 creates reference data on the basis of on one or more of the created plurality of preliminary measurement data (S103).

The calculation part 44 calculates a difference between (i) the preliminary measurement data of a measurement system that does not match the measurement system of the reference data among the plurality of measurement systems and (ii) the reference data created by the reference data creation part 43. The calculation part 44, on the basis of the difference, calculates a correction value for correcting the target measurement data measured by the measurement system corresponding to the preliminary measurement data that does not match the reference data (S104), and finishes the processing.

[Processing Procedure of Identifying the Three-Dimensional Geometry]

Figure 11:
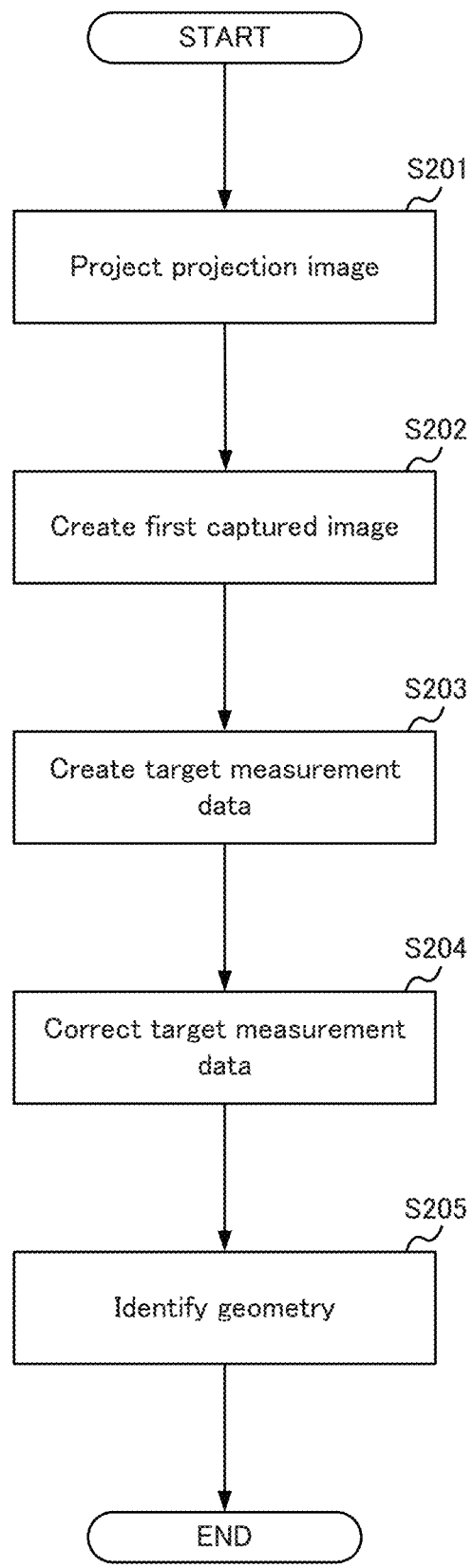
FIG. 11 is a flowchart showing a processing procedure of identifying a 3D geometry of the object to be measured performed by the 3D geometry measurement apparatus.

FIG. 11 is a flowchart showing a processing procedure of identifying the 3D geometry of the object to be measured performed by the 3D geometry measurement apparatus 100. This processing procedure starts when the operation reception part of the 3D geometry measurement apparatus 100 receives a user's operation of instructing the start of measuring a 3D geometry.

First, the target measuring part 411 projects a projection image including a predetermined light pattern onto an object to be measured or the like with the projection part 3 (S201). The target measuring part 411 generates a first captured image captured by the first capturing part 1 by capturing the projection image projected on the object to be measured (S202). The target measuring part 411 creates target measurement data indicating measurement results by measuring a measurement point of the object to be measured (S203). The correction part 45 corrects the target measurement data on the basis of a correction value (S204). The geometry identification part 46 identifies a geometry of the object to be measured on the basis of the target measurement data corrected by the correction part 45 (S205).

[Effect of the 3D Geometry Measurement Apparatus of the Present Embodiment]

According to the present embodiment, the correction part 45 corrects the target measurement data for the plurality of measurement systems using the reference data. Therefore, the correction part 45 can prevent the reduction of measurement accuracy caused by an error in the measurement systems.

Since the geometry identification part 46 can perform the measurement by connecting, with high accuracy, the target measurement data of the plurality of measurement systems, even if there is a portion where the target measurement data cannot be obtained by a certain measurement system due to shadows, saturation, etc., the geometry of the object to be measured can be identified using the target measurement data of another measurement system. For this reason, the geometry identification part 46 can identify the geometry of the object to be measured more efficiently and accurately.

Variation Example

In the present embodiment, the example of the case where the reference data creation part 43 creates the reference data including the 3D coordinates of the plurality of reference points using the preliminary measurement data corresponding to a single measurement system was described. The present disclosure, however, is not limited to this. The reference data creation part 43 may create a certain piece of reference data by selecting one of the plurality of pieces of preliminary measurement data corresponding to the different measurement systems for each reference point. For example, the reference data creation part 43 may select, from among the plurality of pieces of preliminary measurement data corresponding to the different measurement systems, preliminary measurement data corresponding to the measurement system corresponding to, for example, a combination of optical devices with which a parallax becomes the largest, so that accuracy of triangulation for the reference point will be the highest.

Figure 12A:
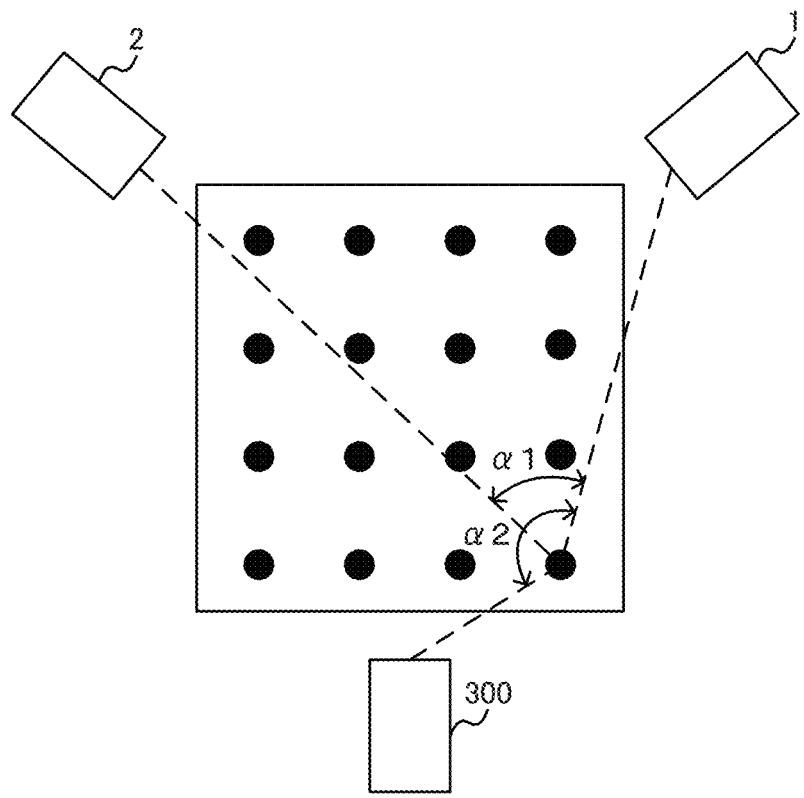
FIGS. 12A and 12B each show how a measurement system is selected in a creation of reference data by a reference data creation part.
Figure 12B:
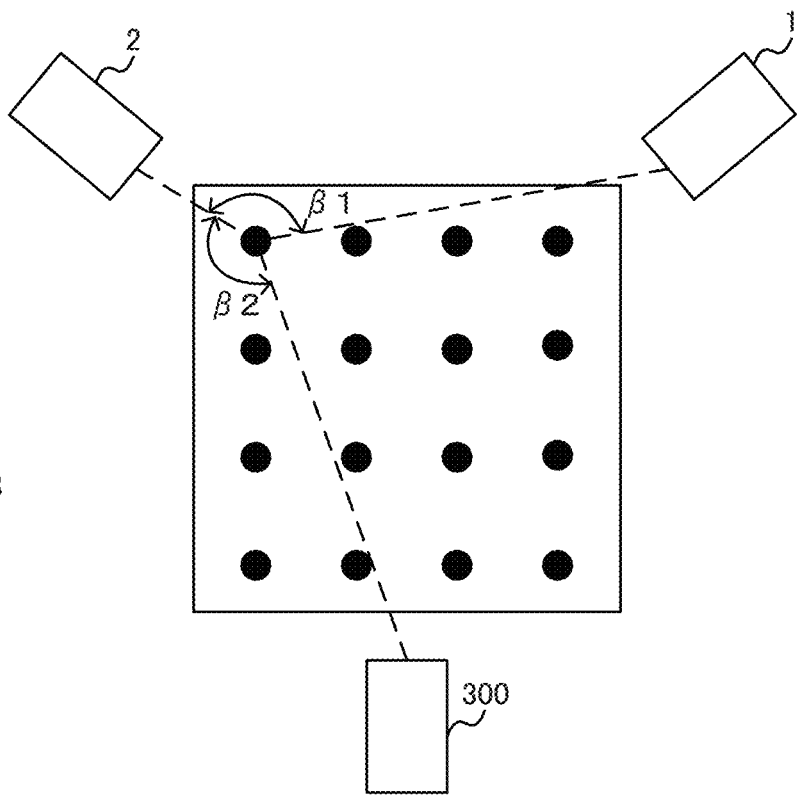

FIGS. 12A and 12B each show how a measurement system is selected in a creation of reference data by the reference data creation part 43. FIGS. 12A and 12B each show the reference instrument 51 viewed from above. In the examples of FIGS. 12A and 12B, the 3D geometry measurement apparatus includes a third capturing part 300 in addition to the first capturing part 1 and the second capturing part 2. In the examples of FIGS. 12A and 12B, the projection part 3 is omitted. For example, when using the reference point on the reference instrument 51, the preliminary measurement part 412 can create preliminary measurement data with the following fourth measurement system to sixth measurement system.

The fourth measurement system: the first capturing part 1 and the second capturing part 2

The fifth measurement system: the first capturing part 1 and the third capturing part 300

The sixth measurement system: the second capturing part 2 and the third capturing part 300

FIG. 12A shows how the measurement system corresponding to the reference point at the right end of the lowest column of the reference instrument 51 is selected. The reference data creation part 43 selects the measurement system corresponding to the combinations of optical devices with which a parallax for the reference point becomes the largest. When the reference data creation part 43 selects the fourth measurement system, the parallax formed by the first capturing part 1 and the second capturing part 2 for the reference point at the right end of the lowest column is α1. On the other hand, when the reference data creation part 43 selects the fifth measurement system, a parallax formed by the first capturing part 1 and the third capturing part 300 for the reference point at the right end of the lowest column is α2, and this parallax is maximum in the fourth measurement system to the sixth measurement system. Therefore, the reference data creation part 43 selects the preliminary measurement data measured by the fifth measurement system in creating the reference data corresponding to the reference point at the right end of the lowest column.

FIG. 12B shows how the measurement system corresponding to the reference point at the left end of the uppermost column of the reference instrument 51 is selected. When the reference data creation part 43 selects the fourth measurement system, the parallax formed by the first capturing part 1 and the second capturing part 2 for the reference point at the left end of the uppermost column is β1. On the other hand, when the reference data creation part 43 selects the sixth measurement system, the parallax formed by the second capturing part 2 and the third capturing part 300 for the reference point at the left end of the uppermost column is β2, and this parallax is maximum in the fourth measurement system to the sixth measurement system. Therefore, the reference data creation part 43 selects the preliminary measurement data measured by the sixth measurement system in creating the reference data corresponding to the reference point at the left end of the uppermost column. The reference data creation part 43 creates a single piece of reference data by combining the preliminary measurement data selected for each reference point of the reference instrument 51.

With such configurations, the reference data creation part 43 creates the reference data using the preliminary measurement data measured by the measurement system in which a parallax for each reference point is maximum, and therefore it is possible to improve the measurement accuracy of the 3D coordinates by using triangulation.

In a case where the reference point, which is projected to the reference instrument 51 by one or more projection parts, is used, the reference data creation part 43 is not limited to the example of selecting, for each reference point, the preliminary measurement data measured by the measurement system in which the parallax formed by a pair of two capturing parts is maximum. For example, the reference data creation part 43 may consider a parallax formed by a pair of two capturing parts and a parallax formed by a pair of a projection part or a capturing part to select, for each reference point, the preliminary measurement data measured by the measurement system that includes the pair in which the parallax is maximum.

If specifications of the capturing parts differ from each other or the distances from the capturing parts to the reference point differ from each other, there may be a case where the measurement system with the maximum parallax does not match the measurement system having the best measurement accuracy. The reference data creation part 43 may read, from storage part 5, a table in which an approximate value of the 3D coordinates of the reference point is associated with the measurement system having the best measurement accuracy, and select the preliminary measurement data of the measurement system having the best measurement accuracy by referencing this table.

Further, the reference data creation part 43 may select the preliminary measurement data of the measurement system having the best measurement accuracy on the basis of a relative distance from the origin to the reference point. For example, when the reference instrument 51 is measured, the reference data creation part 43 designates any reference point on the reference instrument 51 as the origin. The reference data creation part 43 measures a distance from the identified origin to a reference point C, which is a reference point other than the origin. On the other hand, the reference data creation part 43 reads, from the storage part 5, a value stored in advance as the distance from the origin to the reference point C. The reference data creation part 43 may select the preliminary measurement data of the measurement system in which a difference between the measured distance and the distance read from the storage part 5 is the smallest as the preliminary measurement data with the best measurement accuracy of the reference point C.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present disclosure is obvious from the description of the claims.

What is claimed is:

1. A three-dimensional geometry measurement apparatus for measuring a three-dimensional geometry of an object to be measured on the basis of a captured image obtained by capturing the object to be measured, the three-dimensional geometry measurement apparatus comprising:
   a plurality of optical devices;
   a preliminary measurement part that creates a plurality of pieces of preliminary measurement data indicating three-dimensional coordinates of a reference point on a reference instrument by capturing the reference instrument in a plurality of measurement systems corresponding to combinations of different optical devices among the plurality of optical devices;
   a reference data creation part that creates reference data on the basis of one or more of the plurality of pieces of preliminary measurement data;
   a calculation part that calculates a correction value on the basis of the reference data and the preliminary measurement data which does not match the reference data among the plurality of pieces of preliminary measurement data;
   a target measuring part that creates a plurality of pieces of target measurement data indicating results of measuring a measurement point of the object to be measured with the plurality of measurement systems;
   a correction part that corrects the target measurement data in the measurement system corresponding to the preliminary measurement data that does not match the reference data on the basis of the correction value; and
   a geometry identification part that identifies a geometry of the object to be measured using the corrected target measurement data corrected with the correction part,
   wherein parallax is a directional difference between optical axes of a plurality of optical devices included in the combinations of the optical devices, and
   wherein the reference data creation part creates one piece of the reference data for each of a plurality of reference points on the reference instrument by selecting for each reference point, from among a plurality of pieces of the preliminary measurement data corresponding to the plurality of measurement systems, the preliminary measurement data corresponding to a combination of the optical devices having a largest parallax with respect to the reference point.

2. The three-dimensional geometry measurement apparatus according to claim 1, wherein
   the preliminary measurement part creates the preliminary measurement data indicating the three-dimensional coordinates of the reference point of the reference instrument at a plurality of installation positions by capturing the reference instrument installed at the plurality of installation positions, and
   the calculation part calculates the correction value corresponding to the reference point at the plurality of installation positions.

3. The three-dimensional geometry measurement apparatus according to claim 1, wherein
   the reference data creation part creates the reference data by calculating a statistical quantity of the three-dimensional coordinates of the reference point indicated by a plurality of pieces of the preliminary measurement data corresponding to the plurality of measurement systems.

4. The three-dimensional geometry measurement apparatus according to claim 1, further comprising
   an acquisition part that acquires relative positional information indicating a positional relationship of a plurality of the reference points included in the reference instrument, wherein
   the preliminary measurement part creates the preliminary measurement data indicating three-dimensional coordinates of the plurality of reference points, and
   the reference data creation part creates the reference data by selecting the preliminary measurement data indicating the three-dimensional coordinates of the plurality of reference points on the basis of an error with the positional relationship indicated by the relative positional information.

5. The three-dimensional geometry measurement apparatus according to claim 1, wherein
   the preliminary measurement part creates the preliminary measurement data indicating three-dimensional coordinates of a plurality of the reference points on the reference instrument, and
   the reference data creation part creates, for each of the reference points, a certain piece of reference data by selecting one of the plurality of pieces of preliminary measurement data corresponding to the plurality of measurement systems.

6. The three-dimensional geometry measurement apparatus according to claim 1, wherein
   the preliminary measurement part projects a projection image including a pattern for identifying the reference point onto the reference instrument.

7. The three-dimensional geometry measurement apparatus according to claim 1, wherein
   the calculation part identifies a function for calculating the correction value corresponding to the three-dimensional coordinates of the measurement point measured by the measurement system corresponding to the preliminary measurement data that does not match the reference data, and calculates the correction value using the identified function.

8. The three-dimensional geometry measurement apparatus according to claim 1, wherein
   the calculation part further includes a storage part that stores a table in which (i) three-dimensional coordinates of individual grid points of a measurement space of the plurality of measurement systems, the measurement space being divided with cubic grids at equal intervals, (ii) a plurality of the correction values, and (iii) an index for identifying each of the measurement systems are associated with each other, wherein
   the correction part reads, from the storage part, the correction value which is associated with the three-dimensional coordinates of the grid point closest to the three-dimensional coordinates indicated by the target measurement data and the index indicating the measurement system corresponding to this grid point, and corrects the preliminary measurement data on the basis of the read correction value.

9. A three-dimensional geometry measurement method for measuring a three-dimensional geometry of an object to be measured on the basis of a captured image obtained by capturing an object to be measured, the three-dimensional geometry measurement method comprising the steps of:
   creating a plurality of pieces of preliminary measurement data indicating three-dimensional coordinates of a reference point on a reference instrument by capturing the reference instrument with a plurality of measurement systems corresponding to combinations of different optical devices among a plurality of optical devices;

creating one piece of the reference data for each of a plurality of reference points on the reference instrument by selecting for each reference point, from among a plurality of pieces of the preliminary measurement data corresponding to the plurality of measurement systems, the preliminary measurement data corresponding to a combination of the optical devices having a largest parallax with respect to the reference point;

calculating a correction value on the basis of the reference data and the preliminary measurement data which does not match the reference data among the plurality of pieces of preliminary measurement data;

creating a plurality of pieces of target measurement data indicating results of measuring a measurement point of the object to be measured with the plurality of measurement systems;

correcting the target measurement data in the measurement system corresponding to the preliminary measurement data that does not match the reference data, on the basis of the correction value; and identifying a geometry of the object to be measured using the corrected target measurement data, wherein parallax is a directional difference between optical axes of a plurality of optical devices included in the combinations of the optical devices.

* * * * *